(12) United States Patent
Bréard et al.

(10) Patent No.: US 8,984,394 B2
(45) Date of Patent: Mar. 17, 2015

(54) SYSTEM AND METHOD FOR GENERATING A DIGITAL EDITION

(71) Applicant: La Presse, Ltée, Montréal (CA)

(72) Inventors: Nicolas Bréard, Longueuil (CA); Guillaume Hoofd, Montréal (CA); Jean-Michel Feurprier, Brossard (CA); Francis Bélanger, St-Eustache (CA); Philippe-Antoine Rioux, Verdun (CA); Olivier Vandette-Henri, Ste-Thérèse (CA); Mathieu Martin, St-Bruno-de-Montarville (CA)

(73) Assignee: La Presse, Ltée, Montréal, Québec (CA)

( * ) Notice: Subject to any disclaimer, the term of this patent is extended or adjusted under 35 U.S.C. 154(b) by 0 days.

(21) Appl. No.: 14/373,847

(22) PCT Filed: Jan. 10, 2014

(86) PCT No.: PCT/CA2014/050013
§ 371 (c)(1),
(2) Date: Jul. 22, 2014

(87) PCT Pub. No.: WO2014/107808
PCT Pub. Date: Jul. 17, 2014

(65) Prior Publication Data
US 2015/0019949 A1    Jan. 15, 2015

Related U.S. Application Data

(60) Provisional application No. 61/751,506, filed on Jan. 11, 2013.

(51) Int. Cl.
*G06F 17/00* (2006.01)
*G06F 17/22* (2006.01)
(Continued)

(52) U.S. Cl.
CPC ............ *G06F 17/2288* (2013.01); *G06F 17/24* (2013.01); *G06F 17/30011* (2013.01); *G06F 17/2725* (2013.01)
USPC ......................................................... 715/229

(58) Field of Classification Search
CPC .................................................... G06F 17/2288
USPC .................................. 715/200, 229, 273, 277
See application file for complete search history.

(56) References Cited

U.S. PATENT DOCUMENTS

| 5,805,889 A | 9/1998 | Van De Vanter |
| 6,078,934 A | 6/2000 | Lahey et al. |

(Continued)

FOREIGN PATENT DOCUMENTS

| JP | 2001256210 | 9/2001 |
| WO | 2013033664 | 3/2013 |

OTHER PUBLICATIONS

International Search Report, International Application No. PCT/CA2014/050013, Mar. 12, 2014, 3 pages.

(Continued)

*Primary Examiner* — Stephen Hong
*Assistant Examiner* — Gregory J Vaughn
(74) *Attorney, Agent, or Firm* — Brinks Gilson & Lione (57) ABSTRACT

A system and method to concurrently preview or publish a digital edition. The system comprises a compilation database and an assembler system. The assembler system includes: a receiving module to receive page edition data; a verification module to identify pages edited or created since a last successful compilation; a parser to determine whether the pages edited or created since the last successful compilation are error-free or error-generating pages and to generate replacement parsed page data or parsed page data accordingly; and a compiler. The compiler is configured to: compile the parsed page data and generate compiled page data for each of the pages edited or created since the last successful compilation; combine the compiled page data of the pages edited or created since the last successful compilation with compiled page data stored in the compilation database for unmodified pages; and generate compiled edition data.

17 Claims, 6 Drawing Sheets

(51) Int. Cl.
  *G06F 17/24* (2006.01)
  *G06F 17/30* (2006.01)
  *G06F 17/27* (2006.01)

(56) References Cited

U.S. PATENT DOCUMENTS

| | | | |
|---|---|---|---|
| 7,356,766 | B1 | 4/2008 | Baer et al. |
| 7,472,343 | B2 * | 12/2008 | Vasey .......................... 715/234 |
| 8,019,794 | B2 * | 9/2011 | Pathak et al. ................. 707/803 |
| 8,069,407 | B1 * | 11/2011 | Armandpour et al. ........ 715/234 |
| 8,245,133 | B2 | 8/2012 | Grigoriadis et al. |
| 8,352,418 | B2 | 1/2013 | Bailor et al. |
| 2009/0249224 | A1 | 10/2009 | Davis et al. |
| 2009/0254802 | A1 | 10/2009 | Campagna et al. |
| 2010/0004944 | A1 | 1/2010 | Palaniappan |
| 2012/0130954 | A1 | 5/2012 | Hood |
| 2012/0191507 | A1 | 7/2012 | Bramworth et al. |
| 2012/0192064 | A1 | 7/2012 | Antebi et al. |
| 2013/0060612 | A1 | 3/2013 | Hurd |
| 2013/0219267 | A1 | 8/2013 | Gremion et al. |
| 2013/0239030 | A1 | 9/2013 | Cunningham et al. |
| 2013/0263289 | A1 | 10/2013 | Vijayan et al. |
| 2013/0275891 | A1 | 10/2013 | Holiday |

OTHER PUBLICATIONS

Written Opinion of the International Searching Authority, International Application No. PCT/CA2014/050013, Mar. 18, 2014, 4 pages.

* cited by examiner

SYSTEM AND METHOD FOR GENERATING A DIGITAL EDITION

CROSS-REFERENCE TO RELATED APPLICATIONS

The present application is the national phase of International Application No PCT/CA2014/050013, entitled "SYSTEM AND METHOD FOR GENERATING A DIGITAL EDITION", filed on Jan. 10, 2014, which claims the priority benefit of U.S. Provisional Application No. 61/751,506, filed Jan. 11, 2013, each of which is incorporated herein by reference in its entirety.

FIELD OF THE INVENTION

The present invention relates to the field of digital editions. More particularly, it relates to a system and a method to concurrently preview or publish a digital edition, such as, for example and without being limitative, a digital newspaper or a digital magazine, while some of the pages of the digital edition are being edited.

BACKGROUND

In view of the recent popularity of digital publications, several tools allowing the creation of a digital edition of a publication, such as a newspaper, a magazine and/or a book, have become available. Many of these tools allow users to import content such as text, images and/or video, format the content, and generate a digital edition, all without requiring programming skills.

For example, iBook Author™ from Apple™ offers a software solution that allows authors with no editing or programming background to edit and create digital books, one page at a time, via a user friendly interface. These known tools use different systems and methods for creating a digital edition of a publication.

One of the drawbacks of several of the available solutions is that they are not designed for a collaborative environment where a plurality of users create, edit, and/or delete pages of a single or of several edition(s) simultaneously and may request concurrent compilation of the edition, to preview or publish the digital edition.

In the context of a digital periodical publication, such as a daily newspaper, collaborative work of a plurality of individuals who concurrently create, edit, and/or delete pages and/or sections of a single edition is essential, given that the delay for creating the edition is short and therefore requires the structure of the daily digital newspaper (or e-newspaper) edition to be built and updated in parallel, by several people.

The applicant is aware of digital platforms or environments which allow collaboration between users for the creation of a digital publication. Such a platform allowing a plurality of authors to edit the content of a digital edition simultaneously during the creation process is described in United States patent application No. 2010/0004944.

However, known solutions do not provide a system or a method which allow concurrent compilations of the edited content of the digital edition in a collaborative environment while users/authors are still editing pages of the edition. Therefore, using known solutions, when one of the multiple users requests compilation of the digital edition (for example in order to preview the digital edition), the compilation of the edition by the system may raise compilation errors relative to pages of the edition that are currently being edited by other users and may not be formatted properly. Moreover, multiple simultaneous requests for preview of the edition by different users may cause system instability or long delays for each compilation.

In view of the above, there is a need for an improved system and method for the collaborative production of a digital edition, which would be able to overcome or at least minimize some of the above-discussed prior art concerns.

SUMMARY OF THE INVENTION

According to a first general aspect, there is provided a system to concurrently preview or publish a digital edition readable by a dedicated software application running on a communication device, while some of the pages of the digital edition are being edited. The system comprises a compilation database being configured to store compiled page data of pages of the digital edition; and an assembler system. The assembler system includes: a receiving module being configured to receive page edition data representative of pages of the digital edition; a verification module being configured to identify pages edited or created since a last successful compilation; a parser being configured to determine whether the pages edited or created since the last successful compilation are error-free or error-generating pages and to generate replacement parsed page data for each one of the error-generating pages and parsed page data for each one of the error-free pages; and a compiler. The compiler is configured to: compile the parsed page data from the error-generating pages and the error-free pages and generate compiled page data for each of the pages edited or created since the last successful compilation; combine the compiled page data of the pages edited or created since the last successful compilation with compiled page data stored in the compilation database for unmodified pages; and generate compiled edition data including the compiled page data of the pages of the digital edition, the compiled edition data being readable by the dedicated software application running on the communication device.

In an embodiment, the system further comprises an editing system being configured to edit pages of the digital edition and to generate the page edition data representative of the pages.

In an embodiment, the assembler system further comprises a packager being configured to package the compiled edition data into at least one packaged file.

In an embodiment, the assembler system further comprises an output module being configured to output the packaged file.

In an embodiment, the compiler is configured to generate compiled structure data representative of the structure of the digital edition, the compiled structure data being included into the compiled edition data.

In an embodiment, the compiler is configured to generate compiled asset data representative of assets of the pages of the digital edition, the compiled asset data being included into the compiled edition data.

In an embodiment, the system is in communication with a content management system connected to a plurality of data sources, for remotely storing said assets.

In an embodiment, the editing system is concurrently accessible by a plurality of remote terminals over a network.

In an embodiment, the assembler system is accessible by a plurality of remote terminals over a network.

According to another general aspect, there is also provided a computer implemented method for concurrently previewing or publishing a digital edition readable by a dedicated software application running on a communication device, while some of the pages of the digital edition are being edited.

The method comprises the steps of: receiving page edition data representative of pages of the digital edition; identifying pages edited or created since a last successful compilation; determining whether the pages edited or created since the last successful compilation are error-free or error-generating pages; generating replacement parsed page data for each one of the error-generating pages; generating parsed page data for each one of the error-free pages; compiling the parsed page data from the error-generating pages and the error-free pages to generate compiled page data for each one of the pages edited or created since the last successful compilation; storing the compiled page data for each one of the pages edited or created since the last successful compilation of the digital edition in a compilation database; combining the compiled page data of the pages edited or created since the last successful compilation with compiled page data stored in the compilation database for unmodified pages; and generating compiled edition data including the compiled page data of the pages of the digital edition.

In an embodiment, the step of identifying pages edited or created since a last successful compilation comprises the steps of: retrieving the compiled page data relative to a last successful compilation of the page edition data from the compilation database; and comparing at least one timestamp of the received page edition data and at least one timestamp of the compiled page data retrieved from the compilation database to identify the pages edited or created since the last successful compilation.

In an embodiment, the step of storing the compiled page data for each one of the pages edited or created since the last successful compilation of the digital edition in a compilation database comprises the steps of: creating a new compiled edition entry in the compilation database, the compiled edition entry being representative of a compiled digital edition or a compiled revision of a digital edition; creating a new compiled page entry for each one of the pages edited or created since the last successful compilation; and linking each one of the new compiled page entries with the new compiled edition entry.

In an embodiment, the step of combining the compiled page data of the pages edited or created since the last successful compilation with compiled page data stored in the compilation database for unmodified pages comprises the step of linking the latest compiled page entries previously created in the compilation database relative to each one of the unmodified pages with the new compiled edition entry.

In an embodiment, the method further comprises the step of packaging the compiled edition data into at least one packaged file.

In an embodiment, the method further comprises the step of outputting the packaged file.

In an embodiment, the method further comprises the step of generating compiled structure data representative of the structure of the digital edition, the compiled structure data being included into the compiled edition data.

In an embodiment, the method further comprises the step of generating compiled asset data representative of assets of the pages of the digital edition, the compiled asset data being included into the compiled edition data.

According to another general aspect, there is also provided a system for generating a compiled digital edition in a format readable by a dedicated software application stored in a memory of a communication device. The system comprises an editing system being configured to allow editing of at least one page of the digital edition and generate page edition data representative of the at least one page, the editing system being concurrently accessible by a plurality of remote terminals over a network. The system also comprises an assembler system in communication with the editing system, the assembler system being configured to perform concurrent compilations of the page edition data and generate compiled edition data in a format readable by the dedicated software application stored in the memory of the communication device for each one of the compilations. The system also comprises a compilation database in communication with the assembler system and being configured to store compiled page data representative of a successful compilation of the page edition data. Each compilation of the page edition data by the assembler system includes compiling only the page edition data relative to pages of the at least one page of the digital edition which were modified or created since a last successful compilation, compiled page data from the compilation database being used for pages of the at least one page of the digital edition which were not modified since the last successful compilation.

In an embodiment, the assembler system is configured to replace an error generating page with a non-error generating page during the compilation of the page edition data.

The objects, advantages and other features will become more apparent upon reading of the following non-restrictive description of preferred embodiments thereof, given for the purpose of exemplification only, with reference to the accompanying drawings.

DETAILED DESCRIPTION

In the following description, the same numerical references refer to similar elements. The embodiments, described in the present description are preferred embodiments only, given solely for exemplification purposes.

In addition, although the embodiments, as illustrated in the accompanying drawings, consists of several components and although the associated method includes steps as explained and illustrated herein, not all of these components, configurations and steps are essential and thus should not be taken in their restrictive sense. It is to be understood, as also apparent to a person skilled in the art, that other suitable components and cooperation thereinbetween, as well as other suitable configurations, organizations and/or architectures may be used for the system and method for the collaborative production of a digital edition, as will be briefly explained herein and as can be easily inferred herefrom, by a person skilled in the art, without departing from the scope of the invention.

Broadly described, the system and method are designed to allow users to concurrently preview or publish a digital edition, while some of the pages of the digital edition are being edited. In other words, the system and method allow a plurality of users to simultaneously edit and compile a digital edition of a publication, allowing several users to request previews or publication of the digital edition concurrently. By "publication", it is meant that the digital edition is formatted so as to be readable by a data processing device (also referred as "communication device") via a dedicated software application. Such a system and method is of particular relevance in the field of daily digital newspaper production where users are requested to produce an edition in a short period of time and the collaborative work of many people preparing the digital edition is essential.

In the course of the present document, it will be understood that the term "page" is used to define a specific combination of content, arranged according to a specific layout, on a single digital sheet to be displayed on the screen of a data processing device. A "page" can include both text and images, but also other types of content or objects such as web links, interactive animations, graphics, charts, timelines, and the like. In an embodiment, a page can also include sub-pages integrated therein, each one of the sub-pages including the same type of content or objects than a page, as described above. The term "section" is used to define a collection of pages arranged according to a specific order. In the context of a newspaper, a section corresponds for example to the Business section, or the Sports section. The term "edition" is used to define a collection of pages and/or sections, arranged according to a specific order or arrangement.

The term "compilation" is used herein to refer to the process of converting the edition data into a format suitable for transmission to a data processing device or communication device and for subsequent display of the digital edition on a screen of the data processing device, through a dedicated software application running on the data processing device.

In the present document the terms "data processing device" and "communication device" may be used interchangeably, and can include devices such as electronic tablets, smartphones, laptops and desktop computers. A "dedicated software application" is typically an application stored in the memory of the data processing device, adapted to read files in a specific format, dedicated to the application.

In an embodiment, during the compilation process, the data is converted into a lightweight data-interchange format, such as, for example and without being limitative, a JavaScript Object Notation (JSON) format. One skilled in the art will understand that, in an alternative embodiment, other types of format having similar characteristics to the JSON format can be used, such as, for example, XML (Extensible Markup Language) format. The compiled files generated during the compilation can be device independent, i.e. the same file can be used for various communication devices running a different operating system, such as, for example, iOS™ from Apple™ or Android™ from Google™, provided that a dedicated software application configured to read the compiled files is installed thereon.

The term, "page edition data" is used in the present document to refer to the data representative of the pages of the edition; which are edited during the creation of the digital edition, i.e. prior to the compilation. "Page edition data" includes information relating to the layout of each of the pages, such as the position of different objects (images, videos, timelines, charts) in a page. "Page edition data" can also include data relative to the structure of an edition, such as the arrangement of the pages in the different sections. The term "compiled page data" refers to data representative of the pages of a digital edition after being compiled into a compiled format. The term "compiled edition data" refers to data representative of the complete digital edition after being compiled into the compiled format.

Figure 1:
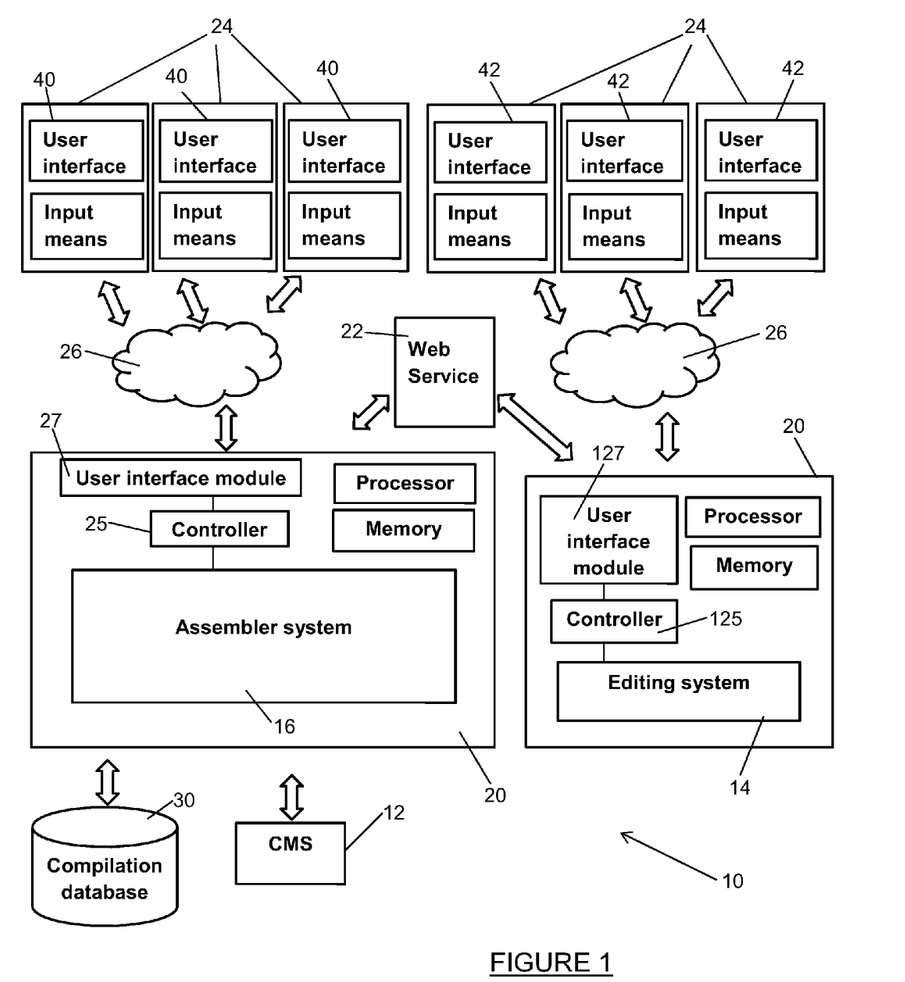
FIG. 1 is a block diagram showing a system for concurrently previewing or publishing a digital edition, while some of the pages of the digital edition are being edited, according to an embodiment.
Figure 2:
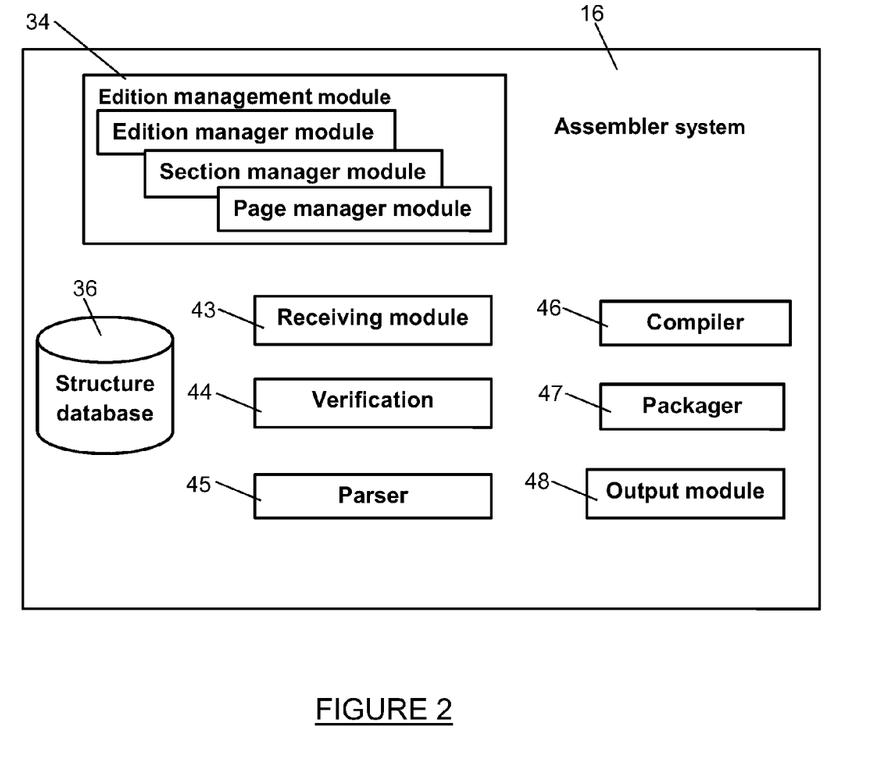
FIG. 2 is a block diagram of an assembler system of the system illustrated in FIG. 1, according to an embodiment.

Referring generally to FIGS. 1 and 2, a system 10 for generating a digital edition is shown, according to an embodiment. The system 10 includes an editing system 14 and an assembler system 16. In general terms, the editing system 14 is a collaborative platform allowing several users to edit pages which are part of a digital edition. It is in the editing system that users/authors create or modify the content and layout of pages of the digital edition. The assembler system 16 is the system which allows assembling, structuring, error handling, and compiling of the different pages and section of the digital edition, for generating a compiled digital edition, i.e. a file which will be readable by a dedicated software application. The editing system 14 and the assembler system 16 can be part of a distributed computing system, where each system 14, 16 is installed on a separate computing unit 20 having its own memory and processor. One skilled in the art would understand that, in an embodiment, the components of the editing system 14 and the assembler system 16 could also be distributed on separate computing unit 20. Moreover, in another embodiment, the editing system 14 and the assembler system 16 may each include a plurality of instances distributed on separate computing unit 20, each one of the instances cooperating with one another to operate as a unified editing system 14 and/or assembler system 16. The communication between the editing system 14 and the assembler system 16 can be made through web services 22 such that the systems are communicatively coupled while remaining independent from each other's format, which results in more flexibility and agility in the development of the systems 14, 16.

One skilled in the art will understand that in the course of the present document, the term "memory" can include generally any tangible computer-readable medium including, for example, persistent memory such as magnetic and/or optical disks, ROM, and PROM and volatile memory such as RAM.

In an embodiment, the system 10 for the collaborative production of a digital edition further comprises a content management system (CMS) system 12 storing content to be inserted in the digital edition. The CMS system 12 is connected to a plurality of data sources for remotely storing assets, such as, for example, images, graphics, interactive objects, advertisements, videos, and the likes, which are to be displayed in a page of the digital edition.

In an embodiment, the system 10 comprises an edition management module 34. The edition management module 34 allows the creation, update and/or deletion of an edition, of pages and/or of sections of an edition. The pages or page canvas created using the edition management module can subsequently be populated/edited using the editing system 14. In an embodiment, the edition management module 34 is a component of the assembler system 16 and is associated with a structure database 36 storing data relative to the structure of editions, i.e. information relative to the arrangement of pages and/or sections of different editions. The edition management module 34 includes an edition manager module, a section manager module and a page manager module, each module being responsible for the creation, update and/or deletion of the corresponding element (i.e. page, section or edition). For example, in the context of a digital newspaper, the edition management module 34 allows creating/updating or deleting 1) the editions, such as the Monday or Tuesday edition, 2) the sections, such as the Headlines, Sports and Business sections, and 3) the pages for each section. Information relating to the structure of an edition (number of sections, number and type of pages) can subsequently be transmitted to the editing system 14, to allow users to edit the canvas or layout of the pages. The edition management module 34 may be controlled by a user via a user interface 40 of the assembler system 16, which will be described in more detail below.

The term, "canvas" is used herein to refer to the general structure of a page, including specific layout constraints, such as for example the positioning of advertisements on the pages, the margins, and the likes.

One skilled in the art will understand that, in an alternative embodiment, the edition management module 34 and the associated structure database 36 can be a component of the editing system 14 rather than the assembler system 16 or could be distinct from the editing system 14 and the assembler system 16, as long as the edition management module 34 is in communication with the assembler system 16 and the editing system 14.

The editing system 14 allows users to edit the content and the layout of the pages of an edition, i.e. users can add, delete or modify the content of the pages and can edit the layout of the content on the page to define how the content is to be displayed on the communication device displaying the digital edition through the dedicated software application. In order to allow the collaborative creation of the edition by multiple users, the editing system 14 can be accessed concurrently by a plurality of remote terminals 24 communicating with the editing system 14 over a network 26, such as, for example and without being limitative, a local area network (LAN) or a wide area network (WAN). Hence, a plurality of users (i.e. more than two users) can simultaneously edit the pages of one or of several edition(s). Different pages of the same edition can thus be simultaneously edited, or the same page can be simultaneously edited by more than one user. In an embodiment, the editing system 14 is controlled by a controller 125 managing communications between the editing system 14 and a user interface module 127.

As explained previously, the data relative to pages of an edition and generated by the editing system 14 is referred as "page edition data". Page edition data is preferably stored in the memory of the computing device 20 hosting the editing system 14, although other storing alternatives are possible.

In order to allow users with no programming skills to be able to easily edit the canvas of a page via the editing system 14, the latter is provided with a user interface 42, displayed on a screen of the remote terminals 24, and through which each user can interact with the editing system 14, using input means such as a keyboard and/or a mouse. The editing system 14 provides users with different tools to populate the pages, with text, titles, images, graphics, interactive objects, advertisements, videos, and other similar assets.

Similarly to the editing system 14, the assembler system 16 can be accessed simultaneously by a plurality of remote terminals 24 over a network 26. Remote terminals are provided with a user interface and input means, such keyboards, mouses and the like. The network can be, for example and without being limitative, a local area network (LAN) or a wide area network (WAN). In an embodiment, the assembler system 16 is controlled by a controller 25 managing communications between the assembler system 16 and a user interface module 27.

When desired, a user can access the assembler system 16 via the user interface 40 and request the digital edition to be previewed or published. In an embodiment, preview or publication of the digital edition can also be triggered automatically by the assembler system 16 when pre-set conditions are met.

When a preview or a publishing request is made, the page edition data is received from the editing system 14 by a receiving module 43 of the assembler system 16. In an embodiment, the transmission of the page edition data to the assembler system 16 is performed by the receiving module 43 of the assembler system 16, which pulls the page edition data from editing system 14. Preferably, the assembler system 16 receives from the editing system 14 only the page edition data of pages which have been edited or created since a last successful compilation of the edition. In the course of the present document, the term successful compilation is used to refer to a compilation of the digital edition which was successfully completed and which generated the compiled edition data.

The system 10 is configured to allow concurrent preview or publication of the digital edition. In other words, the assembler system 16 can provide multiple previews or publication of the digital edition concurrently, i.e. at the same time, to the different users/authors. In an embodiment, in order to prevent system instability that may arise from numerous simultaneous previews or publishing requests by different users, a compilation database 30 is used to store compilation data related to compilations, i.e. data relative to each compilation of the digital edition.

Figure 7:
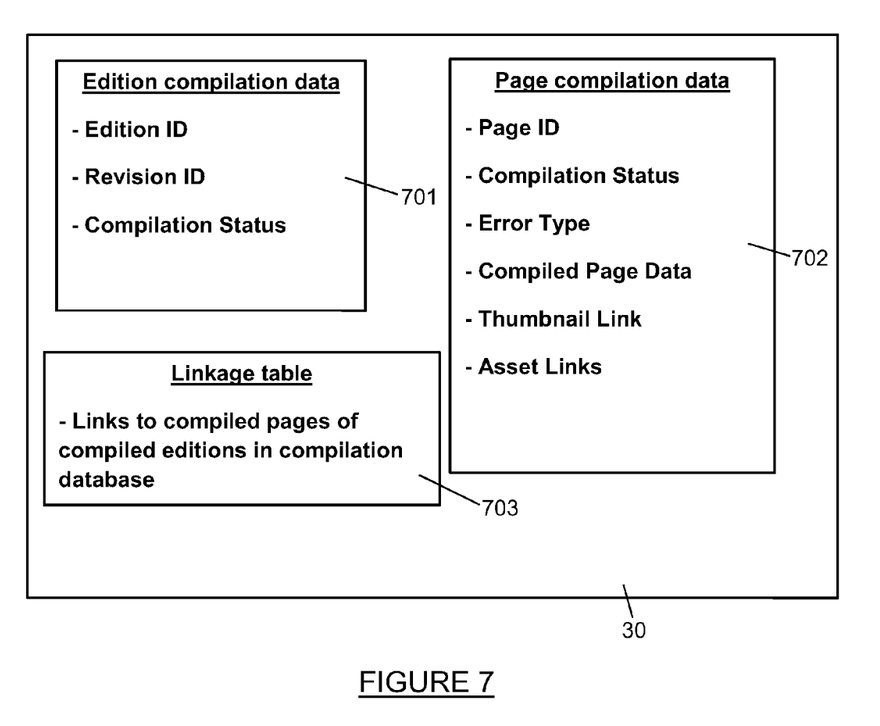
FIG. 7 is a schematic representation of a compilation database for storing compilation data, according to an embodiment.

Referring now to FIG. 7, the compilation data stored in the compilation database 30 includes edition compilation data 701, relative to compiled digital editions; page compilation data 702, relative to compiled pages; and a linkage table 703. In an embodiment, the edition compilation data includes at least an identifier of compiled editions (Edition ID), an identifier of a revision of the edition, which corresponds to each compilation of a same edition (Revision ID), and the status of a compilation of an edition (Compilation Status). In an embodiment, the compiled page data includes at least an identifier of a compiled page (Page ID), the status of a compilation of the page (Compilation Status), the error type in the case of an error-generating page (Error Type), the compiled page data in the lightweight data interchange format, preferably the JSON format (Compiled page data), a link to a thumbnail of the page (Thumbnail Link), and links to the assets of a page, such as, for example, images, graphics, interactive objects, advertisements, videos, and the likes (Asset Links). The linkage table includes the links between the compiled editions and the compiled pages stored in the compilation database and associated with each compiled edition.

One skilled in the art will understand that, the compilation database 30, or any other database referred to in the present description, can be a subset of a larger database of the system 10, i.e. it should be understood that the compilation database 30 can encompass only some of the tables of a larger database used by the system 10.

In an embodiment, the compilation database 30 is in communication with the assembler system 16, such that the compilation data can be stored in the compilation database 30 by the assembler system 16, and can be subsequently retrieved therefrom. In an embodiment, the communication between the compilation database 30 and the assembler system 16 can be managed by a database server communicating with the assembler system 16 and the compilation database 30. It will be understood that in an embodiment, the compilation database 30 can also be part of the assembler system 16.

In an embodiment, the compilation database 30 is used by a verification module 44 of the assembler system 16 in order to determine which pages of an edition have been edited or created since a last successful compilation of the digital edition. This verification allows that only the pages edited or created since the last successful compilation are compiled during the compilation process of the digital edition, as will be described in more details below. In such an embodiment, the compiled page data relative to the last successful compilation of the page edition data is retrieved from the compilation database 30 and is compared with the received page edition data by the verification module 44 to determine which pages were edited or created since the last successful compilation. Pages which were created since the last successful compilation will have no entry in the compilation database 30 and can therefore be identified as pages created since the last successful compilation.

In an alternative embodiment, the verification module 44 of the assembler system 16 can communicate with the editing system 14 in order to determine which pages have been edited or created since a last successful compilation, such that page edition data corresponding only to the pages which pages have been edited or created since the last successful compilation are transmitted from the editing module 14 to the receiving module 43 of the assembler system 16. One skilled in the art will understand that even if the plural form is used to refer to the pages have been edited or created since a last successful compilation, the term also covers the possibility of a single page being edited or created since the last successful compilation, the plural form being used solely for the sake of clarity.

Still referring to FIGS. 1 and 2, the assembler system 16 further includes a parser 45 configured to parse the page edition data relative to pages of the edition when a preview or a publishing request is made. Parsing of the page edition data is performed to validate that the layout of each page is valid and that a page does not generate an error. For example, an error may be generated if an image or if text is located outside of the frame of a page or if objects in a page overlap each other.

In an embodiment, the assembler system 16 is configured to only perform parsing of the pages which have been edited or created since a last successful compilation, as determined by the verification module 44.

It will be understood that since the system 10 allows the collaborative creation and edition of pages and/or sections of an edition, whenever a preview or a publishing request is made by a user, one or more pages can be in the process of being edited by another user, using the editing module 14. Therefore, for example, when a preview request is made by a user, the likelihood that pages being edited by another user generate errors is high, since these pages are not completed. It would be inconvenient that errors in pages other than the ones that have been edited by the user which made the preview request prevent the successful compilation and previewing of the digital edition.

Still referring to FIGS. 1 and 2, the parser 45 is configured to determine whether the pages edited in the editing system are error-free or error-generating pages. For each page that is an error-generating page, the parser 45 is configured to generate replacement parsed page data for that particular page. The replacement parsed data corresponds to parsed data of a predetermined non-error generating page. In an embodiment, the predetermined non-error generating page is a page with pre-defined text indicating that the page generated an error during the parsing process. In another alternative embodiment, the predetermined non-error generating page is a blank page, allowing users to easily detect that this particular page of the digital edition generated an error in the parsing process. For each error-free page, the parser 45 generates the corresponding parsed page data, representative of the data of this particular page. It will be understood that the term "error" is used herein to refer to non-fatal errors which do not cause a system crash or failure. In an embodiment, the parsed page data is stored in a memory of the computing unit 20 onto which the assembler system 16 is installed.

The assembler system 16 also comprises a compiler 46 configured to compile the parsed page data from the error-generating pages and the error-free pages and generate compiled page data. In an embodiment, the compiled page data includes one compiled page file for each one of the pages of the digital edition. In an embodiment, each compiled page file is a .JSON file of the JSON format. One skilled in the art will understand that in an alternative embodiment, the compiled page data could include one compiled page file for a group of pages of the digital edition, for example, the compiled page data could include one compiled page file for all the pages of the digital edition.

In an embodiment where parsing of only the pages which have been edited or created since the last successful compilation, as determined by the verification module 44, is performed, the compiler 46 is configured to subsequently combine the compiled page data of the pages edited or created since the last successful compilation with the compiled page data stored in the compilation database for unmodified pages. Unmodified pages refer to pages which were created previously to the last successful compilation, and therefore have a corresponding entry in the compilation database, but which have not been edited since the last successful compilation. In the event where all the pages of the digital edition have been edited or created since the last successful compilation, combination of the compiled page data of the pages edited or created since the last successful compilation with the compiled page data stored in the compilation database for unmodified pages results in no additional data taken from the compilation database, the compiled page data consisting in solely the compiled page data of the pages edited or created since the last successful compilation.

The compiler 46 is further configured to generate compiled edition data readable by the dedicated software application running on the communication device, for displaying the digital edition on a screen thereof.

In an embodiment, the compiled edition data includes 1) the compiled page data resulting from the above described parsing process and page compilation process 2) compiled structure data and 3) compiled asset data. The compiled structure data is representative of the structure of the digital edition. The compiled asset data is representative of assets of the pages of the digital edition, such as images, videos and/or audio files.

In an embodiment, the compiled structure data generated during the compilation process includes one main compiled file including information regarding the structure of the edition, i.e. the arrangement of the pages and sections of the digital edition. In an embodiment, the compiled structure file is a .JSON file of the JSON format. In an embodiment, the compiled structure data is generated by the compiler 46, using information retrieved from the structure database 36 and relative to the particular digital edition.

In an embodiment, the compiled asset data generated during the compilation process includes an asset or profile compiled file including information regarding assets of the pages which are not included in the compiled page file. For example, the compiled asset data may include an asset identifier (or asset ID) and an asset address (which is preferably a URL) for each asset, in order to download and display the assets in the digital edition. In an embodiment, the compiled asset file is a .JSON file of the JSON format.

In an embodiment, the assembler system 16 further includes a packager 47. The packager 47 is configured to package the compiled files into one packaged file. For example, in an embodiment, the compiled files are packaged into a compressed file such as a .TAR file or a .ZIP file. In an embodiment, the packager 47 packages the compiled page files, the compiled structure file and the compiled asset file into the compressed file. The compressed file comprises all the data required for the dedicated software application running on the data processing device, such as an electronic tablet, to display the digital edition to a user.

In an embodiment, the assembler system further comprises an output module 48 configured to output the compiled edition data. In an embodiment, the output module 48 outputs the packaged file, packaged by the packager 47, for subsequent transmission to the data processing device.

In the case where a preview has been requested, the packaged file may be transmitted to a local data processing device (not shown) such that a preview of the edition can be displayed to a user through the dedicated software application stored in the memory of the device. The term "local" data processing device is used herein to refer to a data processing device used during the creation of an edition, in contrast with devices of readers to which the digital edition is destined, for example subscribers of the digital edition of a newspaper.

In the case where a publication of the edition has been requested, the packaged file can be transmitted to a remote server (or distribution server) (not shown), which includes distribution software for communicating with remote devices. The remote devices have stored in memory the dedicated software application, which was previously downloaded.

The system for generating a compiled digital edition having been described above, a computer implemented method for concurrently previewing or publishing a digital edition readable by a dedicated software application running on a communication device, while some of the pages of the digital edition are being edited will now be described.

Figure 3:
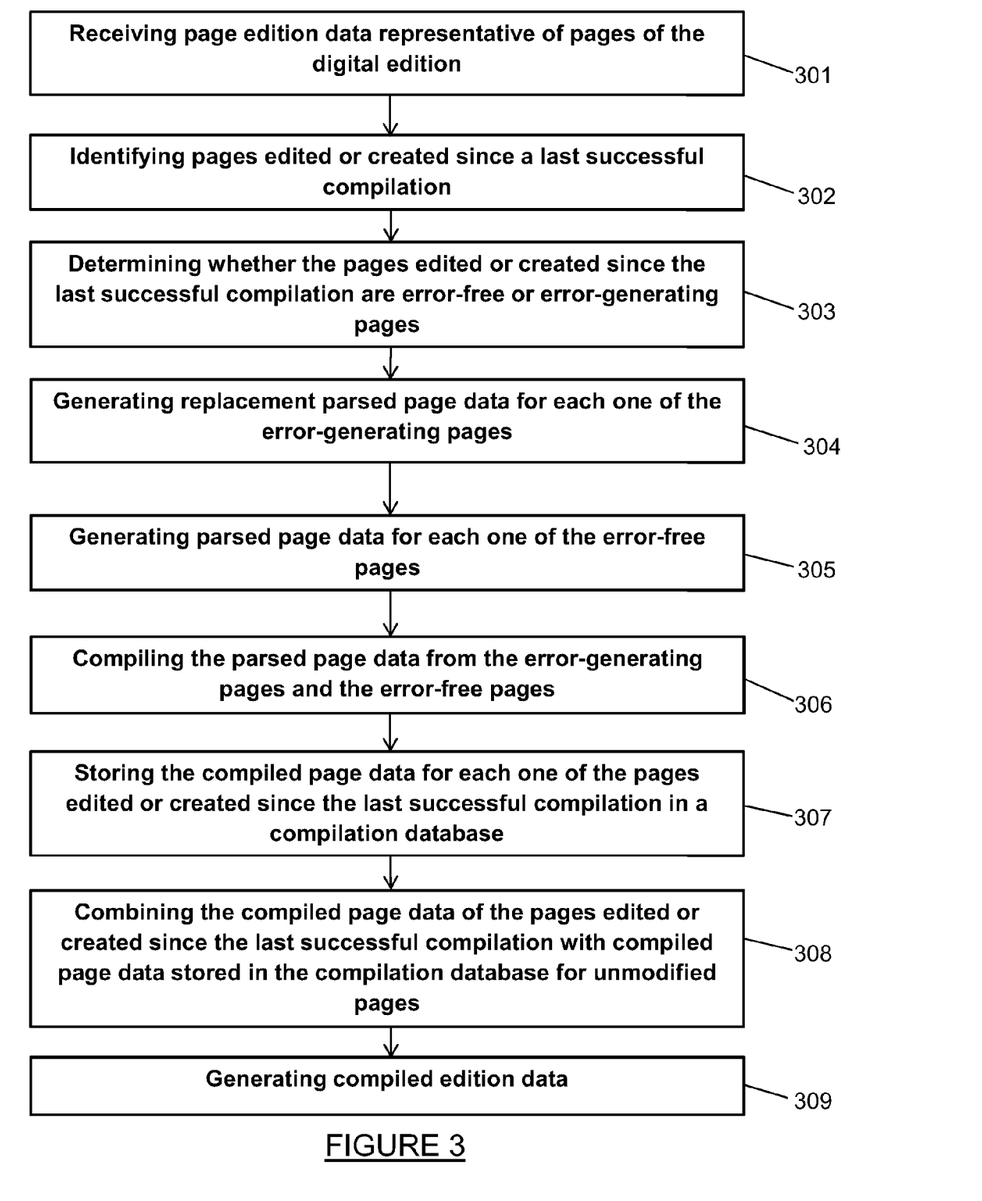
FIG. 3 is a flow chart illustrating the steps of a computer-implemented method for concurrently previewing or publishing a digital edition, while some of the pages of the digital edition are being edited, according to an embodiment.

Referring to FIG. 3, in an embodiment of the method, the receiving module receives page edition data representative of pages of the digital edition (step 301). The verification module identifies the pages edited or created since a last successful compilation (step 302). The parser determines whether pages edited or created since the last successful compilation are error-free or error-generating pages (step 303) and generates replacement parsed page data for each one of the error-generating pages (step 304) and parsed page data for each one of the error-free pages (step 305). The compiler compiles the parsed page data from the error-generating pages and the error-free pages and generates compiled page data for each one of the pages edited or created since the last successful compilation (step 306). The compiled page data for each one of the pages of the digital edition edited or created since the last successful compilation is subsequently stored in the compilation database (step 307). The compiler combines the compiled page data of the pages edited or created since the last successful compilation with compiled page data stored in the compilation database for unmodified pages (step 308) and generates compiled edition data (step 309). The compiled edition data allows for the preview of the edition on a data processing device. As can be appreciated, the method described above allows authors (or console operators) to preview the digital edition, and validate changes they have made in a page of the edition, while other authors/console operators are still modifying the same or other pages of the edition. The method ensures that a compilation of the edition is possible even when pages of the edition are being edited and possibly in error.

Figure 4:
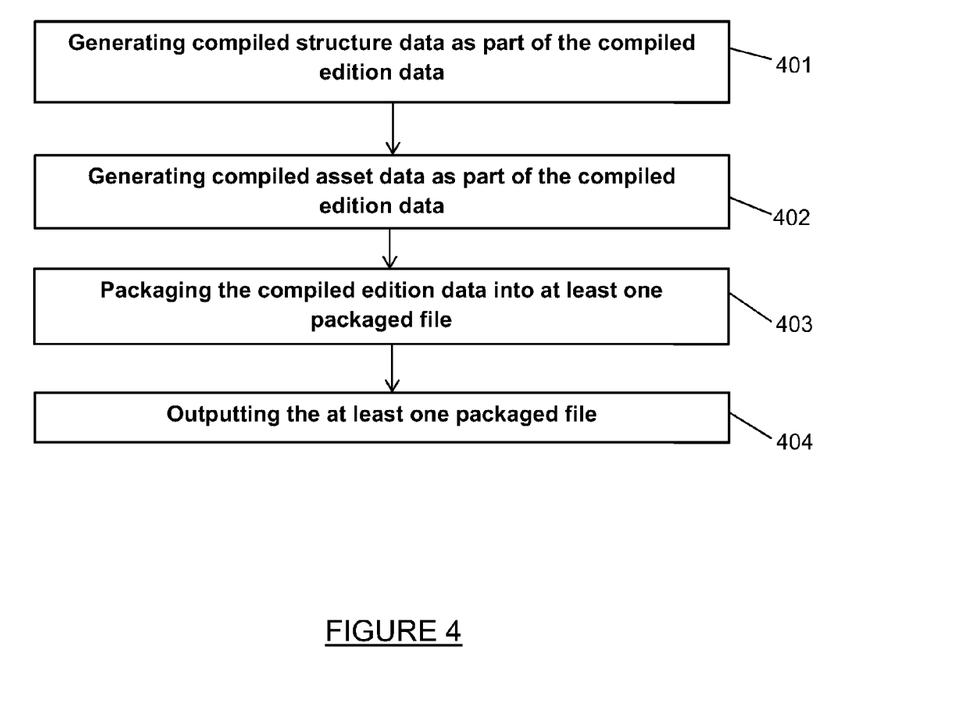
FIG. 4 is a flow chart illustrating optional steps of the computer-implemented method of FIG. 3, according to an embodiment.

Referring to FIG. 4, optional steps of the method are illustrated. As previously mentioned, the compiled edition data includes at least the compiled page data of the pages of the digital edition. In an embodiment, the compiler further generates compiled structure data (step 401) and compiled asset data (step 402), as part of the compiled edition data.

In an embodiment, the packager packages the compiled edition data into one or more packaged file(s) (step 403) and the output module outputs the packaged file(s) (404). One skilled in the art would understand that, in an alternative embodiment the output module can output unpackaged compiled edition data.

Figure 5:
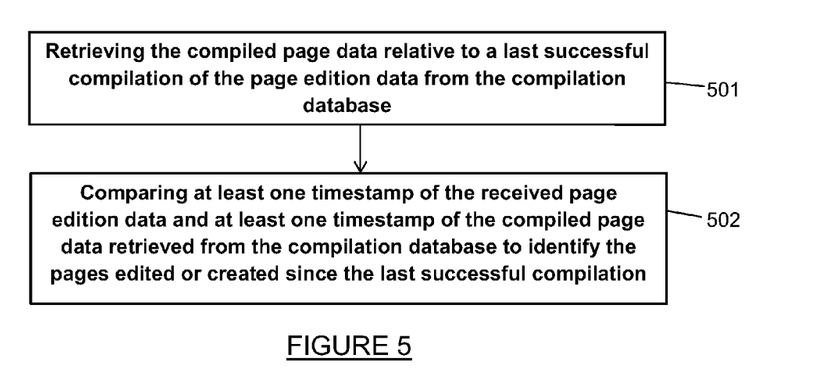
FIG. 5 is a flow chart illustrating optional sub-steps of the computer-implemented method of FIG. 3, according to an embodiment.

Referring to FIG. 5, in an embodiment, the step of identifying the pages edited or created since the last successful compilation (step 302) includes the sub-steps of retrieving the compiled page data relative to a last successful compilation of the page edition data from the compilation database (step 501) and comparing at least one timestamp of the received page edition data indicative of the last modification to each one of the pages and at least one timestamp of the compiled page data retrieved from the compilation database indicative of the last successful compilation of each one of the pages to identify the pages edited or created since the last successful compilation (step 502). It will be understood that, in an alternative embodiment, comparison of the received page edition data and the compiled page data retrieved from the compilation database could also be performed to identify the pages edited or created since the last successful compilation.

Figure 6:
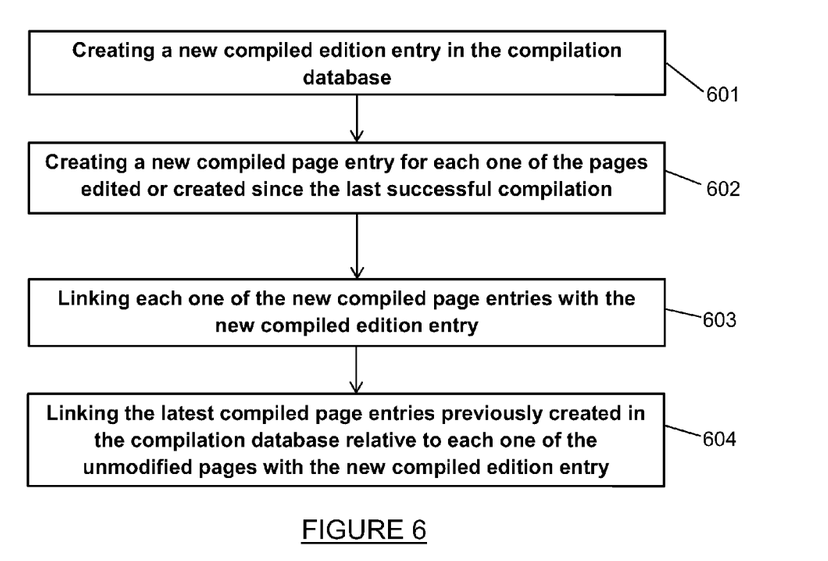
FIG. 6 is a flow chart illustrating additional optional sub-steps of the computer-implemented method of FIG. 3, according to an embodiment.

Referring to FIG. 6, in an embodiment, the step of storing the compiled page data for each one of the pages edited or created since the last successful compilation of the digital edition in a compilation database (step 307) includes the sub-steps of creating a new compiled edition entry representative of a compiled digital edition or a compiled revision of a digital edition in the compilation database (step 601), creating a new compiled page entry for each one of the pages edited or created since the last successful compilation (step 602); and linking each one of the new compiled page entries with the new compiled edition entry (step 603).

It should be understood that in the above described steps, a "compiled revision of a digital edition" is a term used to refer to a new compilation of an existing digital edition, which was previously created.

Still referring to FIG. 6, in an embodiment, the step of combining the compiled page data of the pages edited or created since the last successful compilation with compiled page data stored in the compilation database for unmodified pages (step 308) includes the step of linking the latest compiled page entries previously created in the compilation database relative to each one of the unmodified pages with the new compiled edition entry (step 604).

Several alternative embodiments and examples have been described and illustrated herein. The embodiments of the invention described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not exhaustive or restrictive, and the invention is not to be limited to the details given herein. Accordingly, while specific embodiments have been illustrated and described, numerous modifications come to mind without significantly departing from the invention.

The invention claimed is:

1. A system to concurrently preview or publish a digital edition readable by a dedicated software application running on a communication device, while some of the pages of the digital edition are being edited, the system comprising:
   a compilation database being configured to store compiled page data of pages of the digital edition; and
   an assembler system including:
      a receiving module being configured to receive page edition data representative of pages of the digital edition;
      a verification module being configured to identify pages edited or created since a last successful compilation;
      a parser being configured to determine whether the pages edited or created since the last successful compilation are error-free or error-generating pages, the parser being configured to generate replacement parsed page data for each one of the error-generating pages and parsed page data for each one of the error-free pages;
      a compiler being configured to:
         compile the parsed page data from the error-generating pages and the error-free pages and generate compiled page data for each of the pages edited or created since the last successful compilation;
         combine the compiled page data of the pages edited or created since the last successful compilation with compiled page data stored in the compilation database for unmodified pages; and
         generate compiled edition data including the compiled page data of the pages of the digital edition, the compiled edition data being readable by the dedicated software application running on the communication device.

2. The system of claim 1, further comprising an editing system being configured to edit pages of the digital edition and to generate the page edition data representative of the pages.

3. The system of claim 2, wherein the editing system is concurrently accessible by a plurality of remote terminals over a network.

4. The system of claim 1, wherein the assembler system further comprises a packager being configured to package the compiled edition data into at least one packaged file.

5. The system of claim 4, wherein the assembler system further comprises an output module being configured to output the at least one packaged file.

6. The system of claim 1, wherein the compiler is configured to generate compiled structure data representative of the structure of the digital edition, the compiled structure data being included into the compiled edition data.

7. The system of claim 1, wherein the compiler is configured to generate compiled asset data representative of assets of the pages of the digital edition, the compiled asset data being included into the compiled edition data.

8. The system of claim 7, wherein the system is in communication with a content management system connected to a plurality of data sources, for remotely storing said assets.

9. The system of claim 1, wherein the assembler system is accessible by a plurality of remote terminals over a network.

10. A computer implemented method for concurrently previewing or publishing a digital edition readable by a dedicated software application running on a communication device, while some of the pages of the digital edition are being edited, the method comprising the steps of:
   a) receiving page edition data representative of pages of the digital edition;
   b) identifying pages edited or created since a last successful compilation;
   c) determining whether the pages edited or created since the last successful compilation are error-free or error-generating pages;
   d) generating replacement parsed page data for each one of the error-generating pages;
   e) generating parsed page data for each one of the error-free pages;
   f) compiling the parsed page data from the error-generating pages and the error-free pages to generate compiled page data for each one of the pages edited or created since the last successful compilation;
   g) storing the compiled page data for each one of the pages edited or created since the last successful compilation of the digital edition in a compilation database;
   h) combining the compiled page data of the pages edited or created since the last successful compilation with compiled page data stored in the compilation database for unmodified pages; and
   i) generating compiled edition data including the compiled page data of the pages of the digital edition.

11. The computer implemented method of claim 10, wherein step b) comprises the steps of:
   retrieving the compiled page data relative to a last successful compilation of the page edition data from the compilation database; and
   comparing at least one timestamp of the received page edition data and at least one timestamp of the compiled page data retrieved from the compilation database to identify the pages edited or created since the last successful compilation.

12. The computer implemented method of claim 10, wherein step g) comprises the steps of:
   creating a new compiled edition entry in the compilation database, the compiled edition entry being representative of a compiled digital edition or a compiled revision of a digital edition;
   creating a new compiled page entry for each one of the pages edited or created since the last successful compilation; and
   linking each one of the new compiled page entries with the new compiled edition entry.

13. The computer implemented method of claim 12, wherein step h) comprises the step of linking the latest compiled page entries previously created in the compilation database relative to each one of the unmodified pages with the new compiled edition entry.

14. The computer implemented method of claim 10, further comprising the step of packaging the compiled edition data into at least one packaged file.

15. The computer implemented method of claim 14, further comprising the step of outputting the at least one packaged file.

16. The computer implemented method of claim 10, further comprising the step of generating compiled structure data representative of the structure of the digital edition, the compiled structure data being included into the compiled edition data.

17. The computer implemented method of claim 10, further comprising the step of generating compiled asset data representative of assets of the pages of the digital edition, the compiled asset data being included into the compiled edition data.

* * * * *